United States Patent
Shuck

[11] 3,782,184
[45] Jan. 1, 1974

[54] TORQUE TRANSDUCER AND METHOD OF MEASURING TORQUE

[76] Inventor: Lowell Zane Shuck, Rt. No. 1, Box 361, Rock, W. Va.

[22] Filed: Aug. 3, 1971

[21] Appl. No.: 168,602

[52] U.S. Cl............ 73/101, 73/70.1, 73/99, 73/517 A
[51] Int. Cl. ............................................. G01n 3/32
[58] Field of Search.............. 73/101, 99, 70.1, 73/517 A, 136 R

[56] References Cited
UNITED STATES PATENTS
3,468,161   9/1969   Wise ................................ 73/101
2,217,539   10/1940  Bruin ............................. 73/70.1 X
2,316,253   4/1943   Keinath............................ 73/70.1 X
3,690,168   9/1972   Petersen .......................... 73/99 X

*Primary Examiner*—Jerry W. Myracle
*Attorney*—Luke A. Mattare et al.

[57] ABSTRACT

A torque transducer and method for measuring the complex-shear modulus of very low-modulus materials subjected to sinusoidal, oscillating torques at various freqeuncies wherein means are provided for cancelling from the output signal the inertia effect of the transducer.

27 Claims, 3 Drawing Figures

PATENTED JAN 1 1974

INVENTOR
LOWELL ZANE SHUCK

BY *Shoemaker and Mattare*

ATTORNEYS

TORQUE TRANSDUCER AND METHOD OF MEASURING TORQUE

BACKGROUND OF THE INVENTION

The invention described herein was made in the course of work under a grant or award from the Department of Health, Education and Welfare.

This invention relates to a torque transducer and method for measuring sinusoidally oscillating torques of very low magnitude at high frequencies in materials having a very low shear modulus.

The transducer can transmit, as well as measure, the driving point torque to a low modulus test material whose viscoelastic, deviatoric moduli are to be determined. More particularly, the transducer according to the present invention is capable of measuring sinusoidally oscillating torques from $10^{-6}$ lb-in. to 1.0 lb-in. at frequencies from near static to 500 Hz. The transducer is constructed such that up to 98 percent of the signal error due to the inertial load and transverse vibration of the transducer are cancelled.

In the prior art, measurement of the dynamic complex-shear modulus of very low modulus materials is difficult and often impossible to accomplish. In determining the dynamic shear modulus of very low modulus materials, measurement of the driving point torque to the material being tested is required. Measurement of the driving point torque presents a problem in the prior art due to the inertia of the transducer at the high frequencies encountered in testing the material. At the higher frequencies, 100 Hz and above, for example, and for low modulus materials, 1,000 psi. and below, the input torque could become less than the inertial torque of the transducer by several orders of magnitude. Moreover, most prior art transducers with sensitivities capable of measuring low magnitude torques have very low natural frequencies and are, therefore, unsuitable for measuring small torques at high frequencies. This problem precludes the use of conventional torque cells utilizing strain gauges and the like.

The present invention provides a device and method which enables measurement of sinusoidal torques of a few micro-pound-inches at frequencies up to 500 Hz. More specifically, the present invention provides a dynamic micro-torque transducer utilizing piezoelectric crystal transducing elements arranged in a manner to cancel signal error resulting from the inherent inertia of the transducer itself and wherein the transducer has both a very high frequency response and very high sensitivity.

According to the present invention, the transducer is a symmetrical structure having means at one end for transmitting a sinusoidal oscillatory torque to a test specimen or material and means at the other end thereof connected and arranged relative to a plurality of symmetrically disposed piezoelectric crystals that the inertial effect on the output signal from the transducer is cancelled, so that the output signal from the transducer reflects only the torque resistance of the test material.

The dynamic micro-torque transducer of the present invention comprises a torque input member having substantially identical torque transmission members projecting from the opposite ends thereof. Substantially identical piezoelectric crystals are connected to the torque transmission elements at the opposite ends of the torque input member, and substantially identical disks are connected with the piezoelectric crystals at the opposite ends of the torque input member.

A low modulus material whose complex-shear modulus is to be determined is connected at one of its ends to a torque distribution disk at one end of the transducer and is fixed at its other end. A suitable means is employed to apply a sinusoidally oscillating torque to the torque input member, which transmits the torque through the piezoelectric crystals and the torque distribution disk to the test material at one end of the transducer and also through the torque transmission member and piezoelectric crystals at the other end of the transducer to the disk at the other end of the transducer.

The crystals at one end of the transducer are connected in a circuit such that the signal therefrom is added when the crystals are subjected to simultaneous tensile and compressive forces, respectively, and the crystals at the other end of the transducer are similarly connected in the circuit so that they add when subjected to simultaneous tensile and compressive forces, respectively, with the pair of crystals at one end of the transducer being connected in the circuit with opposite polarity to the crystals at the other end of the circuit so that the signal due to the inertial effect of the unloaded disk cancels the signal due to the inertial effect of the loaded torque distribution disk. The output signal then reflects only the torque resistance of the test material. The dynamic shear modulus of the test material can then be calculated from the three-dimensional, linear, viscoelastic constitutive relations, equations of motion, and compatibility relations along with the initial and boundary conditions. Use of piezoelectric crystals as the transducing elements results in a transducer having a very large elastic stiffness, and due to the small mass of the crystals, a potentially high natural frequency; and, in fact, the stiffness of the transducer in torsion is approximately the stiffness of the crystals. Accordingly, a high sensitivity and high frequency response are realized with the present invention in a transducer capable of measuring micro-torques at high frequencies.

OBJECTS OF THE INVENTION

It is an object of this invention to provide a torque transducer capable of measuring sinusoidally oscillating torques at very low magnitudes and at various frequencies.

Another object of this invention is to provide a transducer which is capable of transmitting, as well as measuring, the driving point torque to a test material whose viscoelastic, deviatoric moduli are to be determined, and wherein the transducer includes means for cancelling that portion of the output signal due to its own inertial load.

A further object of this invention is to provide a dynamic micro-torque transducer for determining the dynamic complex-shear modulus of very low modulus materials at torques from $10^{-6}$ lb-in. to 1.0 lb-in. and at frequencies from near static to 500 Hz.

Yet another object of this invention is to provide a method of measuring dynamic torque wherein the inertia effects of the torque transducer are cancelled.

DETAILED DESCRIPTION OF THE INVENTION

Figure 1:
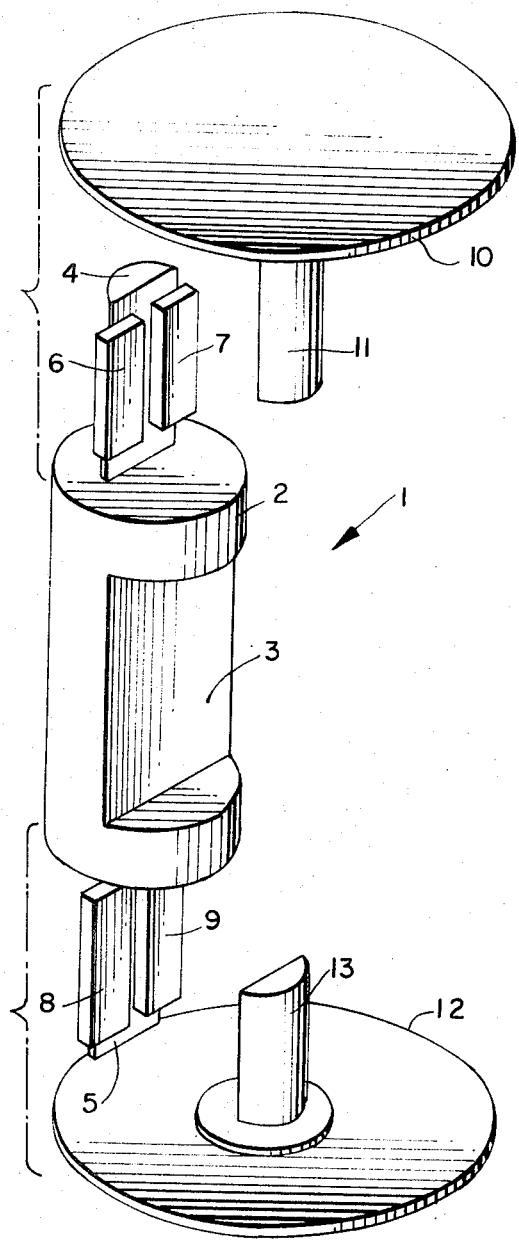
FIG. 1 is an exploded perspective view of the torque transducer of the present invention.

Referring now to the drawings, wherein like reference numerals refer to like parts throughout the several views, a dynamic micro-torque transducer is indicated generally at 1 in FIG. 1 and comprises a cylindrical torque input member 2 having a cut out portion or notch 3 in one side thereof and extending over a major portion of the length thereof. Identical semi-cylindrical aluminum torque transmission members 4 and 5 project axially from the center of the opposite ends of the torque input member 2. A pair of identical piezoelectric crystal transducing elements 6 and 7 are fixed to the torque transmission element 4 at one end of the torque input member 2 and an identical pair of piezoelectric crystal transducing elements 8 and 9 are fixed to the torque transmission member at the other end of the torque input member 2. The piezoelectric crystals 6, 7, 8 and 9 are preferably cut from a single crystal, although it is not essential so long as the crystals are identical. A relatively flat, circular torque distributing member or disk 10 is fixed to the crystals 6 and 7 at one end of the torque input member 2 by means of a relatively short semi-cylindrical shaft 11 projecting axially from the center of the underside of the disk 10, and suitably affixed to the crystals 6 and 7 on the opposite side thereof from the torque transmission member 4. An identical, inertia balancing member or disk 12 and shaft 13 are affixed to the crystals 8 and 9 at the opposite end of the torque input member 2 to define a symmetrical structure and for the purpose of cancelling the inertial effects of the torque distributing disk 10 and shaft 11.

In order to facilitate mass cancellation and to reduce the error in the output signal due to the inertial effects of the transducer itself, the mass moment of inertia of the transducer about the axis C—C must be made small. By way of specific example, the disks 10 and 11 are made of epoxy-impregnated bamboo and the torque transmission members 4 and 5 and 11 and 13 are made of aluminum. Bamboo is a preferred material since it is readily available and has both a high elastic modulus and low mass density. Impregnating the bamboo disks 10 and 12 with epoxy insures uniform density of the disks and even stress distribution therethrough and a constant mass inertia of the disks is achieved even when they are subjected to a humid atmosphere. Epoxy adhesive is also used to attach the various elements to one another and to round out stress concentration areas in the transducer. Further, the use of an epoxy adhesive allows sufficient assembly time to accurately position the crystals and the other elements, and epoxy has elastic constants similar to the crystals. A uniform distribution of stress through the transducer is accordingly achieved. The piezoelectric crystals 6, 7, 8 and 9 are preferably cut from a single crystal of lead-zirconate-titanate of Clevite (registered trademark of Cleveland Graphite Bronze Co.) Type PZT-5A, and number 40 gage magnet wire is used for lead wires to the crystals in order to reduce inertial effects of the transducer.

The disks 10 and 12, the torque transmission members 4 and 5, and the crystals 6, 7, 8 and 9 could be made of other suitable materials and the components of the transducer could be affixed to one another by other suitable means than that specifically described hereinabove, if desired.

Figure 2:
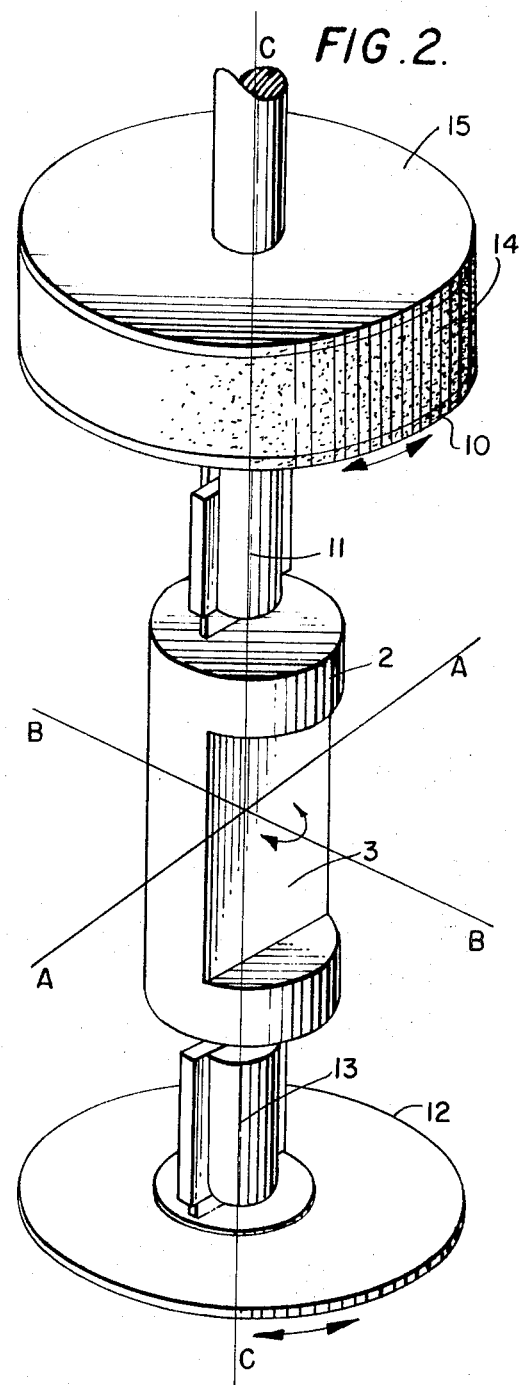
FIG. 2 is a perspective view of the torque transducer of the present invention showing a test material connected between the torque distribution member at one end of the transducer and a static or fixed member.
Figure 3:
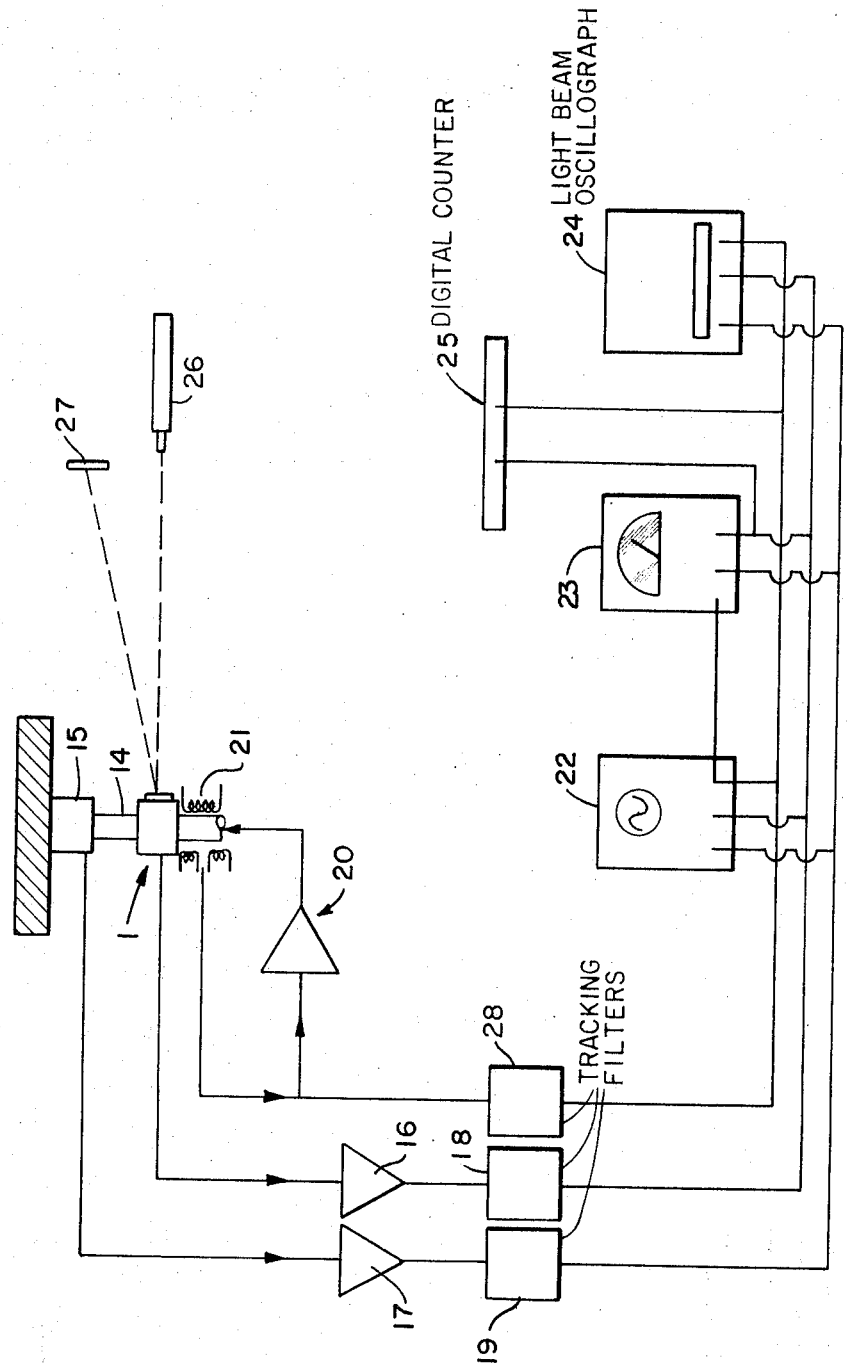
FIG. 3 is a schematic view of the system in which the transducer is used.

Referring now to FIGS. 2 and 3, the system in which the transducer is used is shown. A one-half inch diameter, right circular cylinder 14 of test material having a low modulus, such as rubber, polymer foam or a biological material, such as brain tissue or the like, is suitably affixed at one end thereof to the top surface of torque distribution disk 10 and is fixed at the other end to a static torque transducer 15. The circuit for monitoring and recording the output signals from the transducer includes charge and voltage amplifiers 16 and 17 connected with the dynamic torque transducer 1 and the static torque transducer 15, respectively, and tracking filters 18 and 19 connected in series with the amplifiers for filtering spurious signals due to cable vibration and system noise not originating in the transducer. The noise level of the transducer and approximately 6 feet of 30pF/ft cable with a microdot connector is less than 40 micro-volts in the system shown in FIG. 3.

A feedback control system 20, including a radial variable differential transformer 21 and tracking filter 28, is connected with the dynamic torque transducer 1 to maintain a constant sinusoidal amplitude throughout the frequency range of the transducer.

An oscillograph 22, phase angle meter 23, lightbeam oscillograph 24, and two-channel digital counter 25 are all connected in circuit with the dynamic torque transducer 1 and static torque transducer 15 for monitoring and/or recording the output signals of the transducer. A continuous gas laser 26 and circular scale 27 are positioned to measure the deflection of the dynamic torque transducer during operation. Any suitable means may be used to impart the sinusoidally oscillating motion to the dynamic transducer, such as a hydraulic actuator, which would be operatively connected with the torque input member 2.

The piezoelectric crystals 6, 7, 8 and 9 in the dynamic torque transducer 1 are connected in the circuit such that the crystals 6 and 7 add when subjected to simultaneous tensile and compressive forces, respectively, and the crystals 8 and 9 also add when subjected to simultaneous tensile and compressive forces, respectively. However, crystals 8 and 9 are connected in the circuit with opposite polarity to crystals 6 and 7 when they are subjected to the same inertial loading or acceleration as are crystals 6 and 7. Signals due to inertial reactions of the transducer in translational and rotational modes about all three cartesian axes are accordingly cancelled, and the exclusive measurement of input torque to the test specimen is thus enabled.

In operation, a dynamic torque is applied to the torque input member 2 and transferred through the torque transmission members 4 and 5 and crystals 6, 7, 8 and 9 to the torque distributing disk 10 and inertia balancing disk 12. Inertial forces on the crystals 6 and 7 are due to the inertial reactions of the torque transmission member 4, shaft 11, disk 10 and specimen 14. Remaining force is due to the torque resistance offered by the specimen. The forces on crystals 8 and 9 are due only to the inertial reaction of the disk 12, shaft 13 and torque transmitting member 5. Since the crystals 8 and 9 are connected in circuit with opposite polarity to the crystals 6 and 7, and since the mass moment of inertia of the torque transmitting member 5, shaft 13, and disk 12 is identical to the mass moment of inertia of torque transmitting member 4, shaft 11 and disk 10, the inertial reaction of the torque transmitting members and disks are cancelled and only the torque resistance offered by the specimen is indicated. The importance of cancelling the inertial reaction of the transducer itself is obvious when the relative magnitudes of torque due to inertia of the transducer and torque due to the resistance offered by a low modulus material are considered. The torque reaction of low modulus materials, such as polyurethane foam or biological tissue, can be of the order of $10^{-4}$ lb-in. If the transducer has an inertia equivalent to that of a dime about its cylindrical axis, the inertial torque would be of the order of $10^{-1}$ lb-in. at about 300 Hz. It would be practically impossible to separate the two signals from such a transducer. With the present invention, however, a sinusoidally oscillating torque as small at $10^{-6}$ lb-in. at a frequency up to 500 Hz can be accurately measured.

Since it is extremely difficult to generate a pure torque of the order of $10^{-6}$ lb-in. at all frequencies from 1.5 to 500 Hz, accurately known masses with known mass moments of inertia are used to generate input torque values at specific frequencies. The transducer described herein is able to cancel up to 98 percent of the signal due to its own inertial load and is insensitive to transverse vibrations because of the internal network compensation.

One particular application of the present invention is for use in the determination of the viscoelastic properties of human brain tissue.

As this invention may be embodied in several forms without departing from the spirit or essential characteristics thereof, the present embodiment is therefore illustrative and not restrictive, since the scope of the invention is defined by the appended claims rather than by the description preceding them, and all changes that fall within the metes and bounds of the claims or that form their functional as well as conjointly cooperative equivalents, are therefore intended to be embraced by those claims.

I claim:

1. A torque transducer comprising, torque input means, torque transmitting means connected with the torque input means and with a material to be tested for transmitting the torque from the input means to a material to be tested, and means connected with the torque transducer for cancelling any inertia effects of the torque transducer caused by accelerations imposed on the torque transducer.

2. A torque transducer as in claim 1, wherein the torque input means includes means for imparting a dynamic torque to the torque transducer and to the material to be tested.

3. A torque transducer as in claim 1, wherein the torque input means includes means for imparting a sinusoidally oscillating torque to the torque transducer and the material to be tested.

4. A torque transducer as in claim 1, wherein the torque input means and torque transmitting means are symmetrically arranged.

5. A torque transducer as in claim 4, wherein the torque input means is an elongate member and the torque transmitting means extend axially from the opposite ends of the elongate member.

6. A torque transducer as in claim 5, wherein the torque transmitting means includes a torque distributing load platen at one end of the torque input member.

7. A torque transducer as in claim 6, wherein said inertia cancelling means comprises a structure at the other end of said torque input member substantially identical to said torque distributing load platen.

8. A torque transducer as in claim 7, wherein torque transducing elements are interconnected between said torque input member and said torque distributing load platen and said inertia cancelling means, respectively, thereby sensing all torque transmitted to the material to be tested.

9. A torque transducer as in claim 8, wherein said torque input means is cylindrical, said torque transmitting means comprises identical semi-cylindrical members projecting axially from the center of the opposite ends of the cylindrical input member, said transducing elements comprise a pair of identical piezoelectric crystals on one side of said semi-cylindrical torque transmitting member at each end of the torque input member, said torque distributing load platen comprises a relatively flat circular disk with a semi-cylindrical shaft projecting axially from the center thereof, said shaft being connected to said piezoelectric crystals on said torque transmitting member, and said inertia cancelling means comprises an identical disk and shaft connected to the piezoelectric crystals at the other end of said torque input member.

10. A torque transducer as in claim 9, wherein said semi-cylindrical torque transmitting members are made of aluminum, said piezoelectric crystals are Clevite Type PZT-5A, and said disks comprise epoxy-impregnated bamboo.

11. A torque transducer as in claim 10, wherein the material to be tested is mounted on the top of said torque distributing load platen, the piezoelectric crystals at said one end of said torque transducer are connected in a circuit such that they add when subjected to simultaneous tensile and compressive forces, the pair of piezoelectric crystals at the other end of said torque transducer are connected in said circuit such that they add when subjected to simultaneous tensile and compressive forces, and said pairs of piezoelectric crystals are connected in a circuit with opposite polarity so that the output signal resulting from the inertial effects of said torque distributing load platen are cancelled by the output signal resulting from the inertial effects of said inertia cancelling disk at the other end of said torque transducer.

12. A torque transducer as in claim 11, wherein the material being tested is connected at one end thereof to said torque distributing load platen and is connected at the other end thereof to a fixed torque transducer, said torque transducer being connected in a system for monitoring and recording the signal from said transducers, said system including amplifying means for amplifying the charge and voltage of the signal from said transducers, means for filtering out system noise not originating in the transducer, and indicating means for indicating the output signal of said transducers, said indicated output signal reflecting only the torque resistance offered by the material being tested.

13. A dynamic micro-torque transducer for measuring the torque resistance of a material having a low modulus, said transducer comprising a torque input member, means connected to said torque input member to transmit torque to the material being tested, and means connected to the torque input member for cancelling inertia effects of the transducer due to accelerations imposed on the transducer.

14. A dynamic micro-torque transducer as in claim 13, wherein said torque input member has opposite ends, said means for transmitting torque to the material being tested connected to one end of the torque input member, and said inertia cancelling means including means connected to the other end of said torque input member.

15. A dynamic micro-torque transducer as in claim 14, wherein said torque transmitting means includes a torque distributing load platen for distributing the torque over the material being tested.

16. A dynamic micro-torque transducer as in claim 15, wherein torque transducing elements are connected between said torque input member and said torque distributing load platen.

17. A dynamic micro-torque transducer as in claim 16, wherein the torque input member is elongate, and identical torque transmitting members project axially from the opposite ends of the torque input member.

18. A dynamic micro-torque transducer as in claim 17, wherein said torque transmitting members are semi-cylindrical, and said torque transducing elements comprise piezoelectric crystals mounted on one side of each of said semi-cylindrical torque transmitting members.

19. A dynamic micro-torque transducer as in claim 18, wherein a pair of identical piezoelectric crystals are mounted to each of the torque transmitting members.

20. A dynamic micro-torque transducer as in claim 19, wherein said torque distributing means comprises a relatively flat circular disk with a semi-cylindrical shaft projecting axially from the center thereof, said shaft being mounted to said piezoelectric crystals on said torque transmitting member, and an identical disk and shaft mounted to the crystals at the other end of the torque input member.

21. A dynamic micro-torque transducer as in claim 20, wherein the torque transmitting members, piezoelectric crystals, and disks are symmetrically arranged with respect to the torque input member.

22. A dynamic micro-torque transducer as in claim 21, wherein the pair of piezoelectric crystals at one end of the torque input member are connected in a circuit such that they add when subjected to simultaneous tensile and compressive forces, respectively, and the pair of piezoelectric crystals on the torque transmitting member at the other end of the torque input member are connected in said circuit such that they add when subjected to simultaneous tensile and compressive forces, respectively, said pairs of piezoelectric crystals being connected in a circuit with one pair having opposite polarity to the other pair so that the inertia effect of one disk and torque transmitting member cancels the inertia effect of the other disk and torque transmitting member.

23. A dynamic micro-torque transducer as in claim 22, wherein a material to be tested is connected at one end thereof to the top of said torque distributing disk and at the other end thereof to a static torque transducer, said dynamic torque transducer and static torque being operatively connected in a system for monitoring and recording the output signals of said transducers, said system including amplifying means operatively connected with said transducer for amplifying the signal from said transducers, filter means connected in series with the amplifying means for filtering signals due to system noise not originating in the transducer, and instruments including an oscillograph, phase angle meter, lightbeam oscillograph, and two-channel digital counter connected in series with the filter, and a continuous gas laser and circular scale operatively connected with the dynamic torque transducer, for indicating the output signals and condition of said transducers.

24. A dynamic micro-torque transducer as in claim 17, wherein said torque transmitting members are semi-cylindrical, and said torque transducing elements comprise piezoelectric crystals mounted on one side of each of said semi-cylindrical torque transmitting members, said torque transmitting members and said torque transducing elements symmetrically axially arranged.

25. A method of measuring torque, comprising the steps of connecting a material to be tested to a torque transducer, applying a torque through the torque transducer to the material to be tested, obtaining a signal proportional to the torque applied to the specimen and including any inertia effect of the transducer, obtaining a signal proportional to any inertia effect of the transducer, subtracting the signals, thus cancelling any inertia effects of the transducer due to accelerations imposed on the transducer and obtaining an output signal from said transducer reflecting only the torque resistance of the material to be tested.

26. A method of measuring torque as in claim 25, wherein a sinusoidally oscillating torque is applied to the material to be tested.

27. A method of measuring torque as in claim 26, wherein the torque is varied from $10^{-6}$ lb-in. to 1.0 lb-in. at frequencies of from near static to 500 Hz.

* * * * *